(12) United States Patent
Hull et al.

(10) Patent No.: US 6,684,368 B1
(45) Date of Patent: *Jan. 27, 2004

(54) METHOD FOR SPECIFYING DELIVERY INFORMATION FOR ELECTRONIC DOCUMENTS

(75) Inventors: Jonathan J. Hull, Cupertino, CA (US); Kiyoshi Suzuki, Tokyo (JP); Kurt Piersol, Santa Cruz, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/192,168

(22) Filed: Nov. 13, 1998

(51) Int. Cl.⁷ .............................. H04L 9/00; G06F 17/00
(52) U.S. Cl. ........................ 715/500; 709/206; 707/204; 358/402
(58) Field of Search .......................... 707/204; 345/733, 345/751.2, 839, 846; 358/400–403, 442, 450; 715/500; 709/206

(56) References Cited

U.S. PATENT DOCUMENTS

| | | | |
|---|---|---|---|
| 4,839,741 A | * 6/1989 | Wilson | 346/104 |
| 4,876,609 A | * 10/1989 | Ogura | 358/434 |
| 4,957,689 A | * 9/1990 | Ohnishi et al. | 346/134 |
| 5,241,472 A | 8/1993 | Gur et al. | |
| 5,459,579 A | * 10/1995 | Hu et al. | 358/296 |
| 5,465,353 A | 11/1995 | Hull et al. | 395/600 |
| 5,499,108 A | 3/1996 | Cotte et al. | 358/400 |
| 5,608,786 A | 3/1997 | Gordan | |
| 5,619,649 A | 4/1997 | Kovnat et al. | |
| 5,642,199 A | 6/1997 | Ukai et al. | 358/296 |
| 5,675,507 A | 10/1997 | Bobo, II | 364/514 R |
| 5,689,755 A | 11/1997 | Ataka | |
| 5,701,183 A | 12/1997 | Bellemare et al. | |
| 5,704,060 A | 12/1997 | Del Monte | |
| 5,706,457 A | 1/1998 | Dwyer et al. | 395/349 |
| 5,717,940 A | 2/1998 | Peairs | 395/777 |
| 5,726,883 A | * 3/1998 | Levine et al. | 345/839 |
| 5,732,214 A | 3/1998 | Subrahmanyam | |
| 5,754,308 A | * 5/1998 | Lopresti et al. | 235/375 |
| 5,760,917 A | 6/1998 | Sheridan | |
| 5,764,866 A | 6/1998 | Maniwa | 395/114 |

(List continued on next page.)

FOREIGN PATENT DOCUMENTS

| | | |
|---|---|---|
| JP | 05-308450 | 11/1993 |
| JP | 07/212602 | 8/1995 |
| WO | 95/01821 | 8/1995 |

OTHER PUBLICATIONS

Engst, Adam. Eudora for Windows & Macintosh, 1997, Peachpit Press, pp. xii, 1–5, 10–11, 53–56, 61–65, 74–75, 87–88, 108, 133–143.*

PCT International Preliminary Examination Report for GB 96/01471.

Primary Examiner—Joseph H. Feild
(74) Attorney, Agent, or Firm—Townsend, Townsend and Crew LLP

(57) ABSTRACT

A graphical user interface that presents document destinations in terms of recipient objects readily familiar to the user is provided by the present invention. According to one embodiment of the present invention, a method for specifying delivery information for electronic documents can include the step of displaying a plurality of potential recipients to a user. Responsive to input from the user, the method can select at least one potential recipient from the plurality of potential recipients to form a plurality of selected recipients. The method then performs a scanning operation of a document to form an electronic copy of the document. The electronic copy of the document can be transmitted to the plurality of selected recipients. A step of incorporating the electronic copy of the document into a database belonging to each of the plurality of selected recipients is also included in the method.

25 Claims, 8 Drawing Sheets

U.S. PATENT DOCUMENTS

| | | |
|---|---|---|
| 5,764,918 A | 6/1998 | Poulter |
| 5,764,972 A | 6/1998 | Crouse et al. |
| 5,768,483 A | 6/1998 | Maniwa et al. ............. 395/114 |
| 5,771,101 A * | 6/1998 | Bramall ..................... 358/405 |
| 5,784,177 A * | 7/1998 | Sanchez et al. ............ 358/1.15 |
| 5,790,790 A * | 8/1998 | Smith et al. ................ 709/206 |
| 5,805,298 A | 9/1998 | Ho et al. |
| 5,812,398 A | 9/1998 | Nielsen |
| 5,812,747 A | 9/1998 | Kayano et al. |
| 5,832,474 A | 11/1998 | Lopresti et al. |
| 5,867,597 A | 2/1999 | Peairs et al. ................ 382/209 |
| 5,870,746 A | 2/1999 | Knutson et al. |
| 5,881,233 A | 3/1999 | Toyoda et al. |
| 5,890,163 A | 3/1999 | Todd |
| 5,893,908 A | 4/1999 | Cullen et al. |
| 5,911,044 A | 6/1999 | Lo et al. ................ 395/200.33 |
| 5,978,477 A * | 11/1999 | Hull et al. .................. 358/403 |
| 6,020,980 A | 2/2000 | Freeman |
| 6,115,509 A | 9/2000 | Yeskel |
| 6,219,158 B1 * | 4/2001 | Dawe .......................... 355/75 |
| 6,252,588 B1 * | 6/2001 | Dawson ..................... 345/752 |

\* cited by examiner

Product Brand

○ No one is currently logged in —→  Press your name to save your copy

| Marko Balabanovic | Michael Baxter | Katherin Berkner | Sharon K. Kojima |
| --- | --- | --- | --- |
| Martin Boliek | Rowan Fairgrove | Pamela Gage | Michael Gormish |
| Jamey Graham | Peter E. Hart | Jonathan J. Hull | Toshio Kanoh |
| Dar-Shyang Lee | Belinda Lee | Ziming Liu | Kevin Ridout |
| Bob Runyon | Steve Savitzky | Edward Schwartz | Luisa R. Sarkes |
| David G. Stork | Beverly Uhlrich | Greg Wolff | Gene Wu |
| Show ADC People | Show SBC People | | |
| Send To Group | Save a Fax | Save Patent Doc | Clear |

FIG. 3

METHOD FOR SPECIFYING DELIVERY INFORMATION FOR ELECTRONIC DOCUMENTS

CROSS-REFERENCES TO RELATED APPLICATIONS

The present application makes reference to a commonly owned U.S. patent application Ser. No. 08/754,721, AUTOMATIC AND TRANSPARENT DOCUMENT ARCHIVING, filed Nov. 21, 1996, now U.S. Pat. No. 5,978,477 incorporated herein by reference in its entirety for all purposes.

BACKGROUND OF THE INVENTION

The present invention relates to a document management system and more particularly to a graphical user interface method and apparatus for assisting a user with the tasks of organizing and distributing documents.

With the rapid development of storage system technology, the cost of storing an image of a sheet of paper on digital media has become less than the cost of printing and storing the sheet of paper itself. Digital document storage also facilitates later electronic search and retrieval and raises the possibility of automatic filing of documents.

Systematic digital document storage requires scanning documents to create digitized document images which can then be stored, distributed and retrieved by electronic means. Scanning occurs constantly in the networked office environment in the contexts of copying and faxing.

These processes traditionally have simple push-button interfaces that enable the user to do little more than initiate the cycle of the scanning mechanism. The user must then indicate to the system using operating system commands or iconic representations a choice of medium upon which the electronic image is to be stored. For example, the user may indicate that a scanner incorporate an electronic image onto a diskette in the diskette drive of a computer attached to the scanner. Similarly, facsimile equipment can be attached to a computer that can store electronic copies of documents processed through the facsimile machine.

The distribution of documents can be greatly enhanced by providing a direct link from the image acquisition mechanism, be it fax machine, copier or scanner to the end users in a networked office environment. In a commonly owned U.S. patent application Ser. No. 08/754,721, AUTOMATIC AND TRANSPARENT DOCUMENT ARCHIVING, now U.S Pat. No. 5,978,477 inventors Jonathon Hull et. al. describe a method for achieving exactly this result.

However, further gains may be realized by making document management systems even more user friendly. What is needed is a graphical user interface at the image acquisition point of a document management system that enhances the user's ability to distribute electronic copies of document images processed by the system.

SUMMARY OF THE INVENTION

A graphical user interface that presents document destinations in terms of recipient objects readily familiar to the user is provided by the present invention. According to one embodiment of the present invention, a method for specifying delivery information for electronic documents can include the step of displaying a plurality of potential recipients to a user. Responsive to input from the user, the method can select at least one potential recipient from the plurality of potential recipients to form a plurality of selected recipients. The method then performs a scanning operation of a document to form an electronic copy of the document. The electronic copy of the document can be transmitted to the plurality of selected recipients. A step of incorporating the electronic copy of the document into a database belonging to each of the plurality of selected recipients is also included in the method.

Some embodiments can also include the step of sending a notification to the recipients to inform them that the document has been added to their database. This notification can be an email.

Numerous benefits are achieved by way of the present invention over conventional techniques. In some embodiments, the present invention is easier to use than conventional user interfaces. The present invention can provide a way to display a number of destinations for a plurality of documents to the user on a single screen. Some embodiments according to the invention are easier for new users to learn than known techniques. Because objects in the user interface are readily associated with persons familiar to the user, the learning time required by novice users is decreased and the user interface is more intuitive. These and other benefits are described throughout the present specification.

A further understanding of the nature and advantages of the inventions herein may be realized by reference to the remaining portions of the specification and the attached drawings.

BRIEF DESCRIPTION OF THE DRAWINGS

FIGS. 2–6 depict representative embodiments of the user interface in accordance with the present invention.

DESCRIPTION OF THE SPECIFIC EMBODIMENTS

The preferred embodiment of the present invention displays a person's name or an image of a person on a display screen associated with an automatic document image acquisition mechanism, be it fax machine, copier or scanner. This "personal icon" is a metaphor for the computing resources belonging to a person in the office served by the image capturing device.

The personal icon is depicted on a display screen associated with an image capturing device for documents, such as a copier, scanner or facsimile machine. In response to a user selecting a particular person's icon, the scanned image of a particular document is sent to a database associated with the user. The personal icon can be generated by any number of methods such as a scanned photograph, or picture taken with a digital camera. A name representation can also be used in some embodiments. This interface is especially useful when used in conjunction with automated office environments. One example of such an environment is described in U.S. patent application Ser. No. 08/754,721, entitled, "AUTOMATIC AND TRANSPARENT DOCUMENT ARCHIVING," now U.S. Pat. No. 5,978,477 which is incorporated herein by reference in its entirety for all purposes. Preferably, documents described herein for use with the system include text or images, however other types of documents are also contemplated, such as multimedia documents with audio and video information.

In a presently preferred embodiment, the personal icon interface is presented to the user of a copier or other image acquiring device. It provides a readily familiar selection mechanism to the user, a picture or name of the owner of the recipient computing resource for selecting destinations of electronic copies of documents. By doing so, the expected learning curve for the present system is believed to be low and the expected increase in efficiency of the user is believed to be high. Additionally, the personal icon metaphor can be expected to gain wide acceptance with users because a person's name or face is easy to recognize by most people.

Overall Architecture For Automatic Archiving

Figure 1:
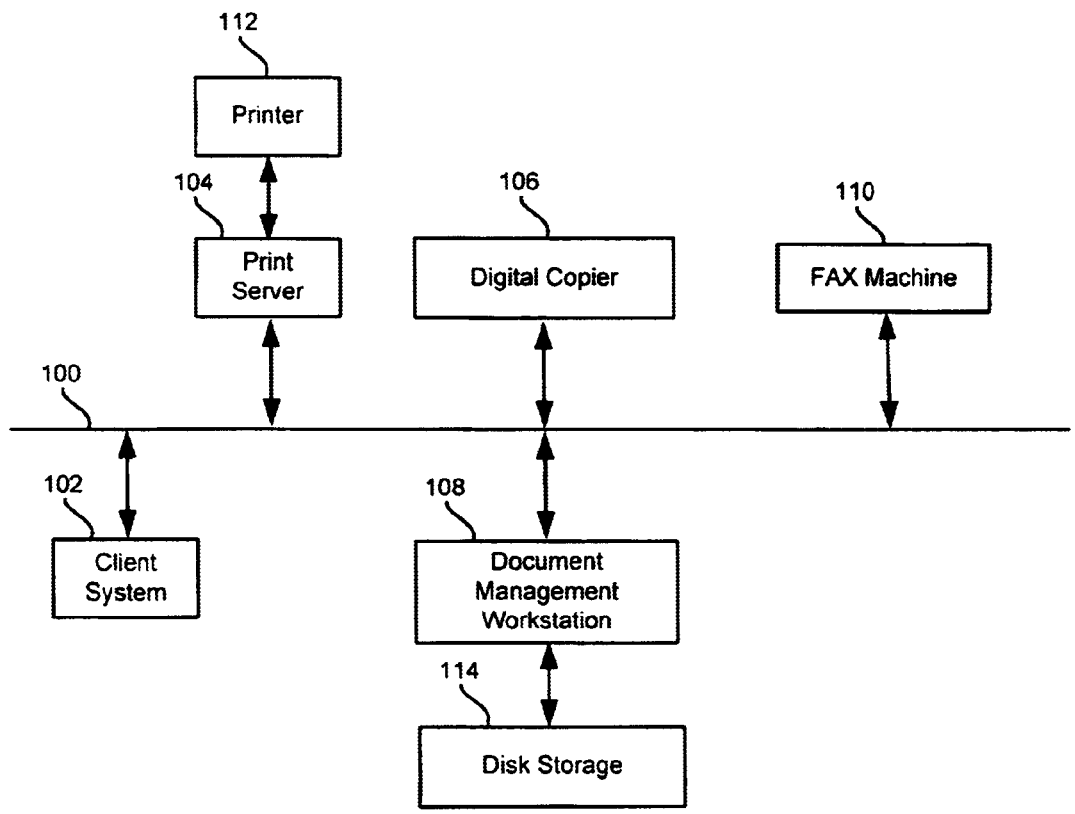
FIG. 1 depicts a representative network office environment implementing the user interface to automatic document archiving in accordance with one embodiment of the present invention.

FIG. 1 depicts an office machine network implementing automatic document archiving in accordance with one embodiment of the present invention. A network 100 may be implemented in any way, e.g., an Ethernet. Network 100 interconnects a representative client system 102, a print server 104, a special digital copier 106, a document management workstation 108, and a special facsimile machine 110. Print server 104 controls printing on a representative printer 112 at the request of client system 102 and relays document image data characterizing to document management workstation 108 for archiving. Digital copier 106 copies documents and transmits image data obtained during the course of copying to document management workstation 108 for archiving. Similarly, facsimile machine 110 captures image data during the course of sending and receiving documents and transmits the image data to document management workstation 108 for archiving. Document management workstation 108 collects the document image data collected from all of the office equipment and maintains an archive on a disk storage unit 114. Client system 102 may browse this archive.

The configuration of network 100 is of course only representative. For example, automatic archiving of documents may be implemented with only one or two types of office machines instead of the depicted types. Also, functionality of one or more units shown in FIG. 1 may be combined into the same unit or divided among many units.

Automatic Archiving of Copied Documents

Figure 2:
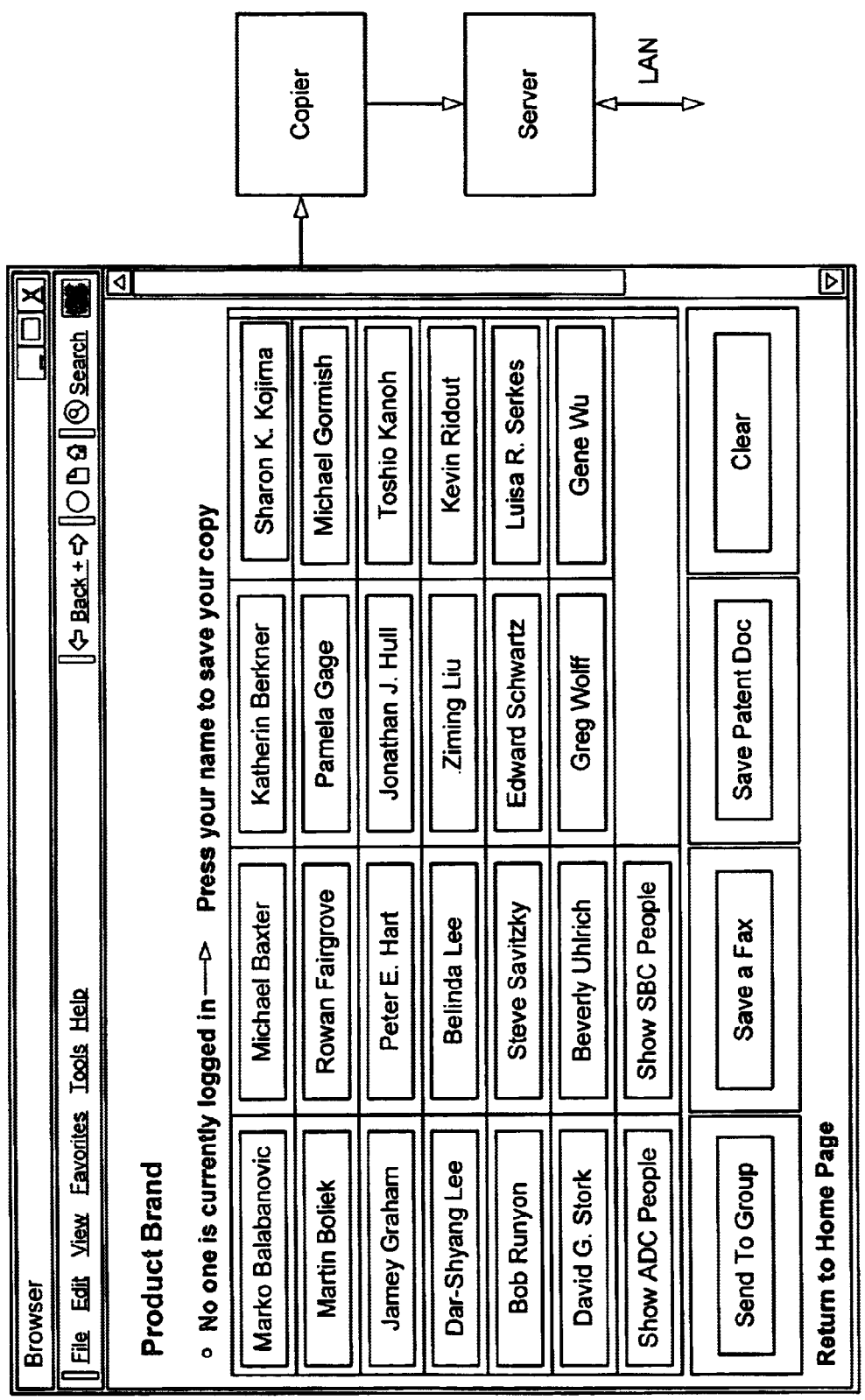

In accordance with one embodiment of the present invention, digital copier 106 creates electronic copies of documents that are copied. FIG. 2 depicts a simplified representation of a portion of a personal selection interface 200 usable with digital copier 106. Digital copier 106 is interconnected to document management workstation 108 that performs storing via network 100. Network 100 also provides a distribution medium for electronic copies of documents created by digital copier 106.

FIG. 3 illustrates the contents of personal selection interface 200 associated with copier 106 of FIG. 2, according to a preferred embodiment of the present invention. Personal selection interface 200 has a display area 304 that includes one or more person's iconic representation, each iconic representation associated with the computing resources of a person to whom an electronic copy of the document can be delivered. For example, personal icon 310, bearing the name "Marko Balabanovic" can be selected to distribute an electronic copy of a document processed by digital copier 106 to Marko Balabanovic's database. Some iconic representations can also be associated with functions. For example, icon 360 allows the user to select the function "send to a group." Some embodiments can also include items such as a menu bar, a status bar, one or more tool bar buttons in a tool button area 374, such as button 376, a horizontal scroll bar 370 and a vertical scroll bar 372. In the present preferable embodiment, a tactile sensitive display screen enables the user to enter her selections of particular persons using the personal selection interface 200.

Figure 4:
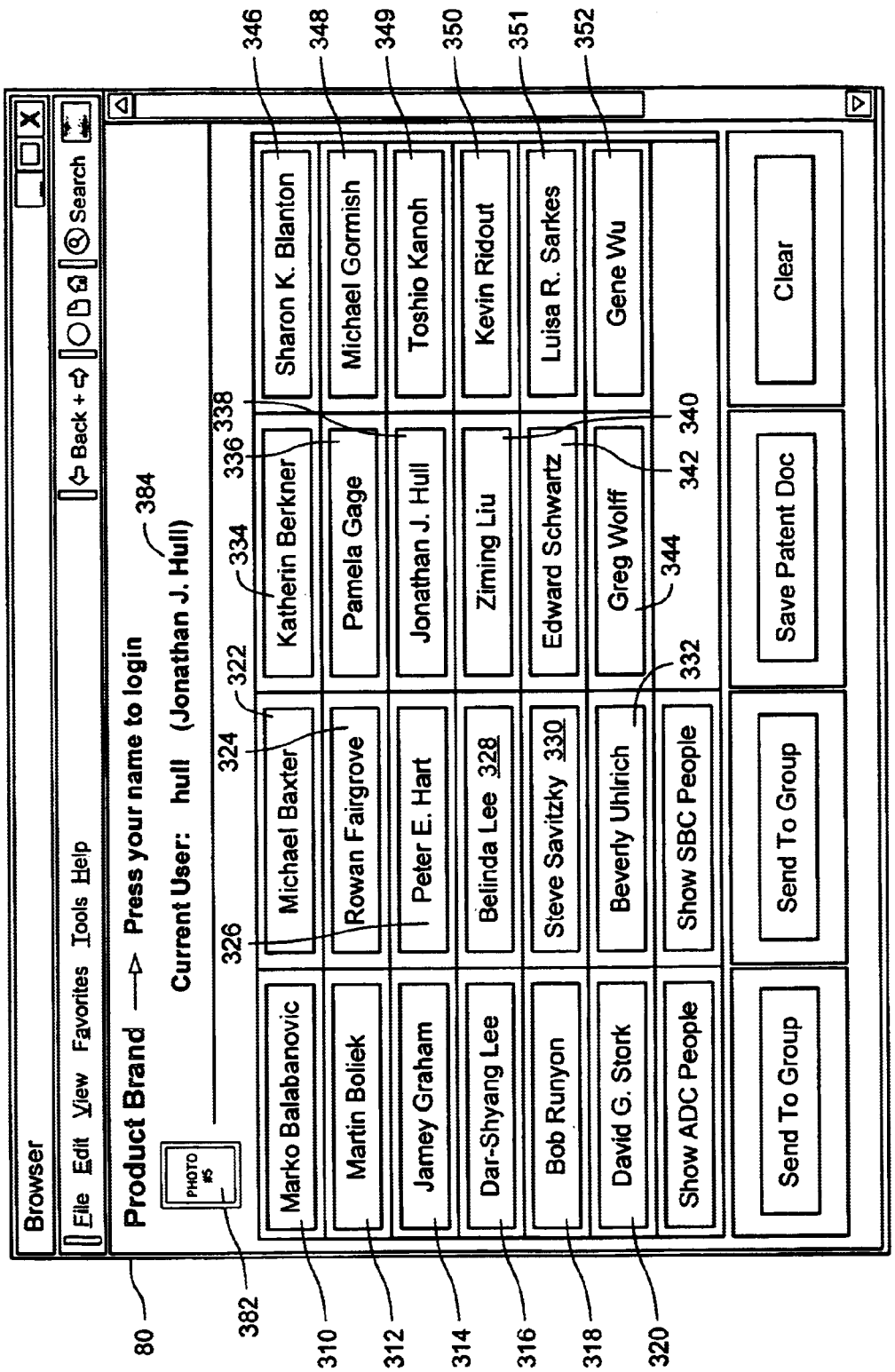

FIG. 4 illustrates the process of accessing the system by a particular user. In FIG. 4, the user has logged on to the copier. In response, a status area 380 displays a personal icon of the user 382. Additionally, a second personal representation of the user, a text name 384 is also displayed in status area 380. This user information confirms the user currently authorized to use digital copier. As illustrated in FIG. 4, the user can then access the digital copier and distribute electronic copies to individuals selected using the personal icons. As described, the personal selection interface and each of the personal icons 310–352 are metaphors which provide an easy and intuitive way for users to manipulate electronic documents in the networked office environment. The presently preferred embodiment of the invention contemplates any number of personal iconic representations.

Figure 5:
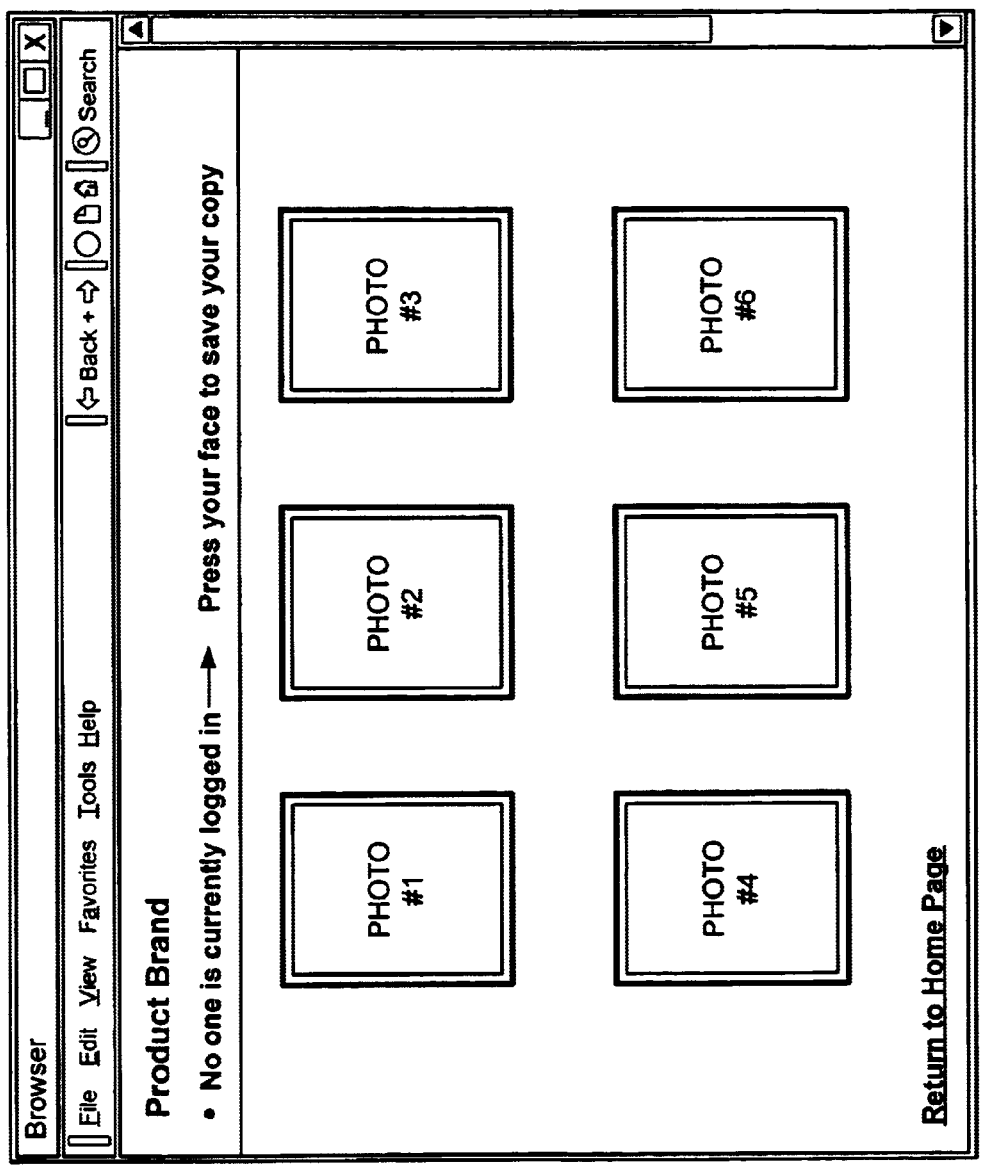

FIG. 5 illustrates another representative embodiment of the person selection interface 502 having personal selection icons 510, 512, 514, 516, 518 and 520. These personal icons are pictures of the persons associated with particular computing resources. In some embodiments, these computing resources include one or more databases. The user can select the destination databases by touching the tactile sensitive display in the area of the picture of the recipient.

Figure 6:
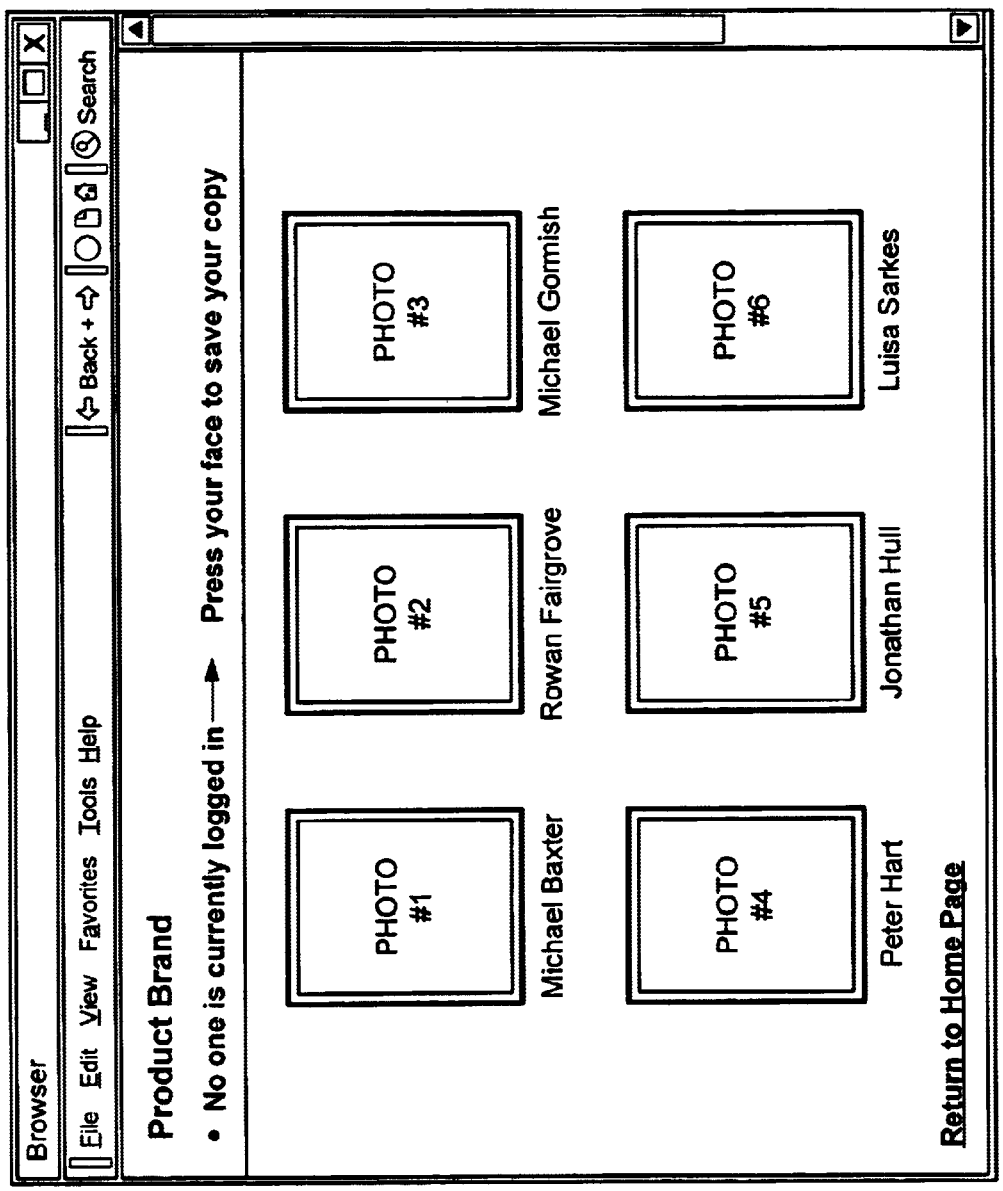

FIG. 6. illustrates another embodiments that combines the picture personal icons with name representations.

Details of the hardware for the copying and archiving processes will be made clearer with reference to FIGS. 7–8.

Figure 7:
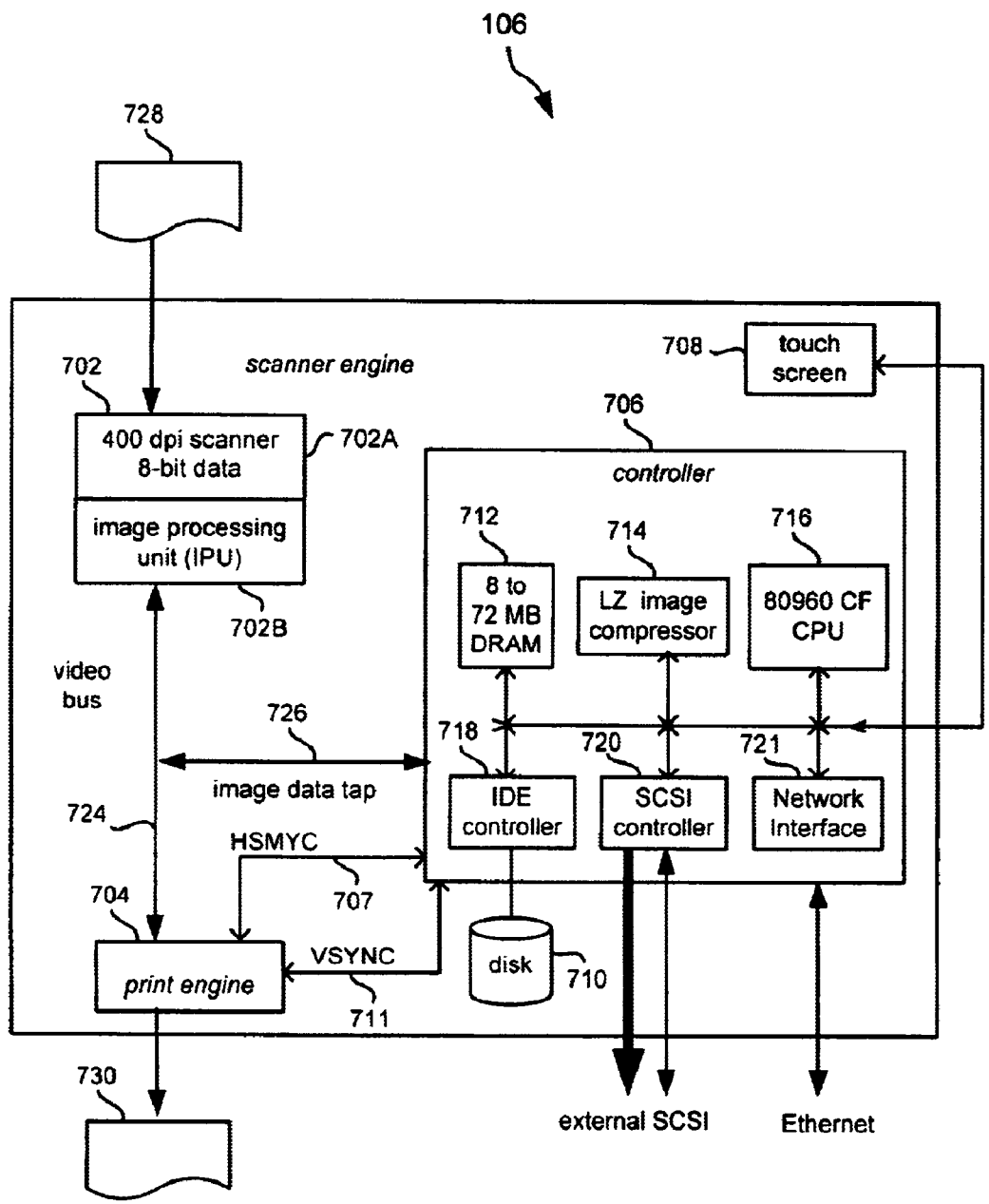
FIG. 7 depicts a representative top-level diagram of a digital copier implementing automatic document archiving in accordance with one embodiment of the present invention.

FIG. 7 depicts a top-level diagram of digital copier 106 implementing automatic document archiving in accordance with one embodiment of the present invention. Digital copier 106 includes a scanner engine 702, a print engine 704, a controller 706, a touch screen 708, and an internal disk storage unit 710. Controller 706 includes a DRAM unit 712, an LZ image compressor 714, a CPU 716, an IDE controller 718, a SCSI controller 720, and a network interface 721. A bus 723 interconnects the controller elements. Scanner engine 702 includes a scanner 702A and an image processing unit 702B. A video bus 724 interconnects scanner engine 702 and print engine 704. An image data tap 726 provides controller 706 with access to image data transferred over video bus 724. Controller 706 also takes advantage of an HSYNC signal 707 and a VSYNC signal 711 generated within print engine 704.

Digital copier 106 accepts a document 728 and prints a copy 730 upon depression of Start/Copy key 206. Scanner 702A captures an image of document 728 and transmits the image to image processing unit 702B. Image processing unit 702B operates to remove distortion inherent in the scanning process. The output of the image processing unit is preferably in a format where 8 bits represent the grey-scale level of a pixel, there are 4380 active pixels per line, and there are 3380 active lines per frame or document page. There is a 10 pixel blanking period before and after each active line, making the total number of pixels per line, 4400. Similarly, there is a 10 line blanking period before and after every frame, making the total number of lines in a frame 3400. Of course, these parameters are only design choices.

This pixel data is forwarded from image processing unit 702B to print engine 704 for printing. The data rate over video bus 724 is preferably 20 MHz. Controller 706 monitors video bus 724 via image data tap 726 to receive the same pixel data. Although, it would be possible to monitor the pixel data prior to image processing unit 702B, the advantage to monitoring on video bus 724 is that image processing unit 702B is tightly coupled to scanner 702A and can monitor and correct for errors inherent in the scanning process.

Controller 706 performs overall control functions for digital copier 106 including the archiving functions. CPU 716, an Intel 80960 CF microcontroller, operates the control program for the operation of digital copier 106. Image data is often transferred into controller 706 at a faster rate via image data tap 726 than the image data can be archived. Accordingly, DRAM unit 712, preferably incorporating 8 to 72 MB of DRAM, acts as a buffer for image data. This allows printing of the copy to continue without interruption by the archiving process.

To save on storage space and facilitate faster data transfer across network 100, LZ image compressor 714 may compress the image data prior to archiving in accordance with the Lempel-Ziv image compression format. Of course, any image compression format may be chosen in accordance with the invention. With each block of image data to be archived, controller 706 incorporates the user ID data received from touch screen 708.

The actual archiving of document images may occur either locally or remotely. Controller 706 may maintain the archive on disk storage unit 710, in which case the image data will be transferred via IDE controller 718. The archive may also be maintained either internally or externally on SCSI drives to which image data is transferred via SCSI controller 720. Note, that if the archive is maintained on disk storage unit 710, or a disk drive accessible via SCSI controller 720, digital copier 106 will absorb some or all of the functionality of document management workstation 108. If the archive is maintained on document management workstation 108, network interface 721 sends the image data there via network interface 100 along with the user ID data for each particular document. Typically, LZ image compressor 714 is used in applications where documents are archived locally as opposed to remotely.

Document Management Workstation

Figure 8:
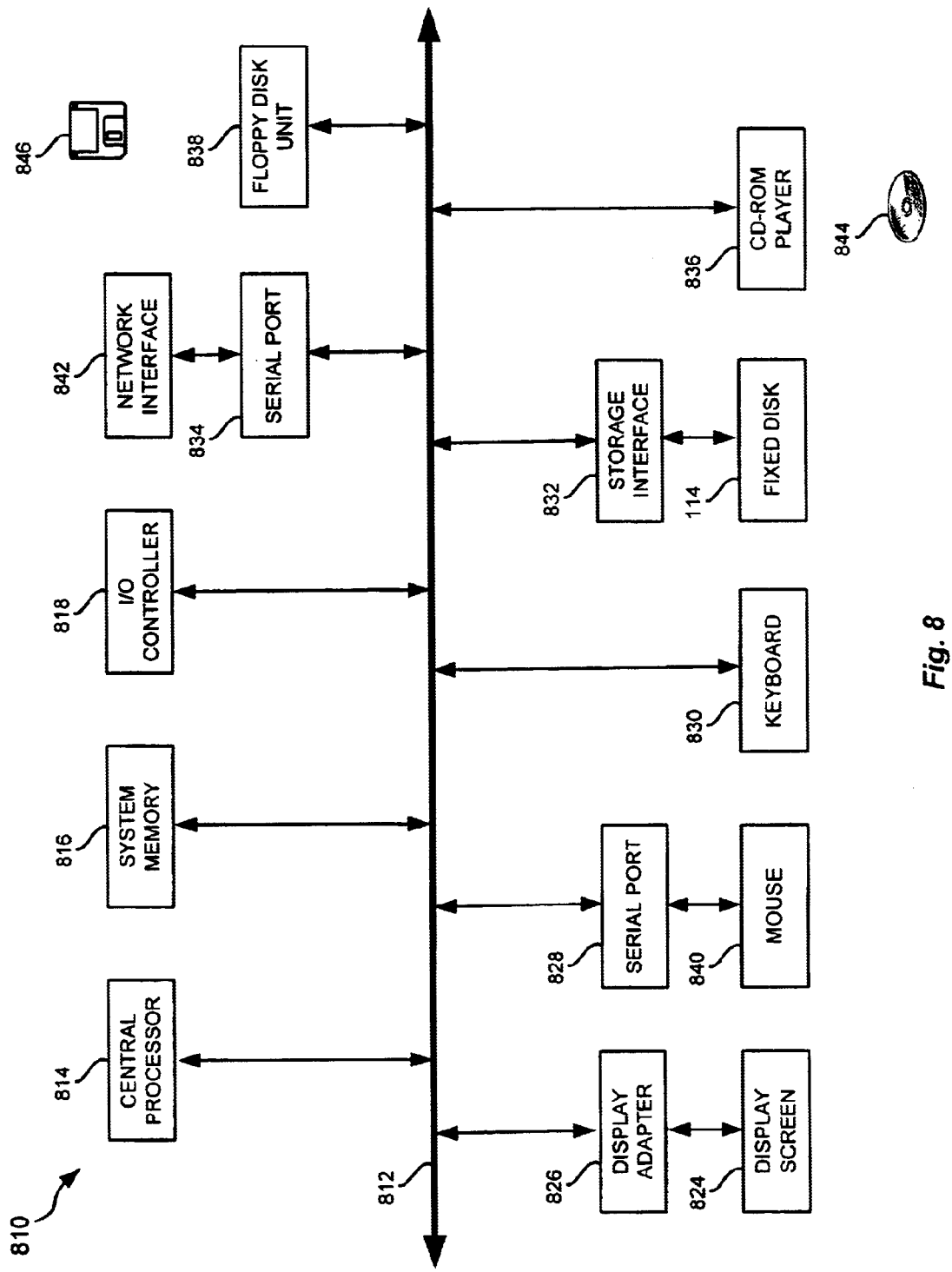
FIG. 8 depicts a representative computer system usable for implementing elements of the present invention.

FIG. 8 depicts a computer system 810 usable for implementing any one or more of client system 102, print server 104, or document management workstation 108 in accordance with one embodiment of the present invention. Computer system 810 includes bus 812 which interconnects major subsystems such as central processor 814, system memory 816, input/output (I/O) controller 818, external device such as display screen 824 via display adapter 826, serial port 828, keyboard 830, fixed disk drive 114 via a storage interface 832, a serial port 834, a CD-ROM player 836, and a floppy-disk drive 838. A mouse 840 may connect to serial port 828. A network interface 842 for connection to network 100 may connect to serial port 834. CD-ROM player 836 receives a CD-ROM disk 844. Floppy-disk drive 838 receives a floppy disk 846. Many other devices or subsystems (not shown) may be connected in a similar manner. Also, it is not necessary for all of the devices shown in FIG. 8 to be present to practice the present invention, as discussed below. The devices and subsystems may be interconnected in different ways from that shown in FIG. 8. The operation of a computer system such as that shown in FIG. 8 is readily known in the art and is not discussed in detail in the present application. Source code to implement elements of the present invention may be operably disposed in system memory 814 or stored on storage media such as fixed disk 830, floppy disk 846, or CD-ROM 844.

Conclusion

In the foregoing specification, the invention has been described with reference to a specific exemplary embodiments thereof. Many changes or modifications are readily envisioned. For example, changing the size or arrangement of the button representations on the display, changing the appearance and features of the displayed images; adding audio effects to indicate that the display has detected an input, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method for specifying delivery information for electronic documents comprising:

displaying, to a user, information identifying a plurality of potential users;

receiving a single input indicating a selection of one or more users from the plurality of potential users;

responsive to the single input:

scanning the document to form an electronic copy of the document;

generating the hard copy of the document using the electronic copy; and transmitting the electronic copy to the one or more users.

2. The method of claim 1 further comprising:

sending an email to the one or more users, the email indicating that the electronic copy is available to the one or more users.

3. The method of claim 1 further comprising:

archiving the electronic copy of the document into an archival database without further input from the user, wherein the user need not be aware of the archiving.

4. The method of claim 1 wherein the information identifying the plurality of potential users comprises an iconic image of the one or more users.

5. The method of claim 1 wherein the information identifying the plurality of potential users comprises one or more names of the one or more users.

6. The method of claim 1 wherein the information identifying the plurality of potential users comprises one or more names and one or more iconic images of the one or more users.

7. The method of claim 1 further comprising:

accepting a login from the user; and responsive to the login, displaying a name and an iconic image of the user.

8. The method of claim 1 wherein the scanning is performed by a copier.

9. The method of claim 1 wherein the scanning is performed by a facsimile machine.

10. A method for specifying delivery information for electronic documents in a networked environment having a plurality of destination nodes, the method comprising:

producing a representation for at least a first potential user and a second potential user included in a plurality of potential users;

associating the representation for the first potential user with a first destination node included in the plurality of destination nodes;

associating the representation for the second potential user with a second destination node included in the plurality of destination nodes;

displaying, to a user, the representation for the first potential user and the representation for the second potential user;

receiving a single input indicating a selection of the first potential user and the second potential user;

responsive to the single input:
scanning the document to form an electronic copy of the document;
generating the hard copy of the document using the electronic copy; and
transmitting the electronic copy to the first potential user and the second potential user; and
archiving the electronic copy of the document into an archival database without further input from the user, wherein the user need not be aware of the archiving.

11. A computer program product stored on a computer-readable storage medium for specifying delivery information for electronic documents, the computer program product comprising:

code for displaying, to a user, information identifying a plurality of potential users;

code for receiving a single input indicating a selection of one or more users from the plurality of potential users;

responsive to the single input:
code for scanning the document to form an electronic copy of the document;
code for generating the hard copy of the document using the electronic copy; and
code for transmitting the electronic copy to the one or more users.

12. The computer program product of claim 11 further comprising:
code for sending one or more emails to the one or more users, the one or more emails indicating that the electronic copy of the document is available to the one or more users.

13. The computer program product of claim 11 further comprising:
code for archiving the electronic copy of the document into an archival database without further input from the user, wherein the user need not be aware of the archiving.

14. The computer program product of claim 11 wherein the information identifying the plurality of potential users comprises one or more iconic images of the one or more users.

15. The computer program product of claim 11 wherein the information identifying the plurality of potential users comprises one or more names of the one or more users.

16. The computer program product of claim 11 wherein the information identifying the plurality of potential users comprises one or more names and one or more iconic images of the one or more users.

17. The computer program product of claim 11 further comprising:
code for accepting a login from the user; and
code for displaying, responsive to the login, a name and an iconic image of the user.

18. The computer program product of claim 11 wherein the scanning is performed by a copier.

19. The computer program product of claim 11 wherein the scanning is performed by a facsimile machine.

20. A method of communicating an electronic document using a facsimile machine, the method comprising:
displaying information identifying a plurality of potential users on the facsimile machine;
receiving a single input indicating a selection of one or more from the plurality of potential users; and
responsive to the single input:
scanning the document using the facsimile machine to form an electronic copy of the document;
faxing the electronic copy of the document to the facsimile recipient using the facsimile machine; and
transmitting the electronic copy to the one or more users.

21. The method of claim 20 further comprising:
archiving the electronic copy of the document in an archival database without further input from the user, wherein the user need not be aware of the archiving.

22. In a networked environment comprising a plurality of destination nodes and a copier machine, the copier machine comprising:
an output module;
a controller module;
a scanner; and
a print engine;
wherein the output device is configured to display information identifying a plurality of potential users;
wherein the controller module is configured to receive a single input indicating a selection of one or more users from the plurality of potential users; and
wherein, responsive to the single input, the controller module is configured to:
cause the scanner to scan the document to generate an electronic copy of the document;
cause the print engine to generate the hard copy of the document using the electronic copy of the document; and
transmit the electronic copy of the document to a destination node associated with the one or more users.

23. The copier machine of claim 22 wherein the controller is further configured to archive the electronic copy of the document in an archival database without further input from the user, wherein the user need not be aware of the archiving.

24. In a networked environment comprising a plurality of destination nodes and a facsimile machine, the facsimile machine comprising:
an output module;
a controller module;
a scanner; and
a facsimile engine;
wherein the output device is configured to display information identifying a plurality of potential users;
wherein the controller module is configured to receive a single input indicating a selection of one or more users from the plurality of potential users; and
wherein, responsive to the single input, the controller module is configured to:
cause the scanner to scan the document to generate an electronic copy of the document;
cause the facsimile engine to fax the electronic copy of the document to the facsimile recipient; and
transmit the electronic copy of the document to a destination node associated with the one or more users.

25. The facsimile machine of claim 24 wherein the controller is further configured to archive the electronic copy of the document in an archival database without further input from the user, wherein the user need not be aware of the archiving.

* * * * *